United States Patent
Nagai et al.

(10) Patent No.: US 6,581,721 B2
(45) Date of Patent: Jun. 24, 2003

(54) VALVE FOR A CONTROL MUFFLER

(75) Inventors: Tadashi Nagai, Tokyo (JP); Kai Shiraishi, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 7 days.

(21) Appl. No.: 09/955,952

(22) Filed: Sep. 20, 2001

(65) Prior Publication Data

US 2002/0033303 A1 Mar. 21, 2002

(30) Foreign Application Priority Data

Sep. 20, 2000 (JP) ........................................ 2000-285319

(51) Int. Cl.⁷ .............................. F01N 1/00; F16K 17/00
(52) U.S. Cl. ..................... 181/237; 181/254; 137/527.4; 137/527.6; 137/535
(58) Field of Search ................................. 181/237, 254, 181/269, 272, 275, 241; 137/527, 527.4, 527.6, 535; 251/84–88

(56) References Cited

U.S. PATENT DOCUMENTS 5,614,699 A * 3/1997 Yashiro et al. .............. 181/254
5,723,827 A * 3/1998 Sasaki et al. ................ 181/237
5,801,343 A * 9/1998 Suzuki et al. ............... 181/254
5,984,045 A * 11/1999 Maeda et al. ............... 181/254
6,176,347 B1 * 1/2001 Chae et al. .................. 181/254
2002/0029807 A1 * 3/2002 Nagai et al. .............. 137/527.6

FOREIGN PATENT DOCUMENTS

JP          11324638 A   * 11/1999   ............. F01N/1/08
JP          2002106323 A * 4/2002    ............. F01N/1/08

* cited by examiner

Primary Examiner—Robert E. Nappi
Assistant Examiner—Edgardo San Martin
(74) Attorney, Agent, or Firm—Sughrue Mion, PLLC

(57) ABSTRACT

A valve for a control muffler includes: a valve element which is swingably journaled on a support shaft 5 supported by shaft holes 41a of a pair of first shaft supporting portions 41 inside the support shaft 5; bushes 6 which are respectively interposed between the support shaft 5 and a pair of second shaft supporting portions 33 that are disposed on the valve element to pivotally support the support shaft 5; and a coil spring which urges the valve element in a valve closing direction. In the valve, a welding rising portion 41b which protrudes in the axial direction is disposed on an outer opening edge of the shaft hole 41a of each of the pair of first shaft supporting portions 41, and the support shaft 5 is welded to tip ends of the welding rising portion 41b.

7 Claims, 5 Drawing Sheets

PRIOR ART

PRIOR ART

VALVE FOR A CONTROL MUFFLER

BACKGROUND OF THE INVENTION

1. Field of the Invention

The present invention relates to a valve for a control muffler placed in an open end of an exhaust pipe in a muffler or the like, to be opened and closed so as to maintain exhaust pressure of a muffler chamber on the upstream side, to a predetermined value or smaller.

2. Description of the Related Art

Conventionally, an exhaust gas pressure sensitive control muffler is configured in the following manner. During a low engine speed period when the exhaust gas pressure is low, the pressure of the exhaust gas flowing from an inlet pipe P1 into the muffler M is low. Therefore, a countermeasure against noises is taken so that, as shown in FIG. 5, therefore, a closed state of a valve element 3 is maintained by the urging force of a torsion coil spring as indicated by a solid line in the figure to allow the exhaust gas flowing from the inlet pipe P1 to flow through an inner pipe P2 and then be discharged to the outside from an outlet pipe P3, and a small chamber on the upstream side from an inner pipe 1 serves as resonant chamber.

By contrast, when the engine speed is increased and the pressure of the small chamber on the upstream side from the inner pipe 1 exceeds the urging force of the torsion coil spring, the valve element 3 enters an opened state as indicated by the one-dot chain line in the figure to allow the exhaust gas to flow through a flow path elongating from an inner pipe P4 to the inner pipe 1, so that the small chamber on the upstream side from the inner pipe 1 serves as an expansion chamber to lower the back pressure at a high speed.

As a valve which is used in a muffler of this kind, known is a valve shown in FIG. 6. This valve is placed at the downstream end of the inner pipe (exhaust pipe) 1 through which small chambers in the muffler M are connected to each other. The valve element 3 is swingably supported via a bush (bearing) 6 by a support shaft 5 which is welded and fixed to a first shaft supporting portion 41 protruding from a peripheral edge of the downstream end of the inner pipe 1, and urged in a valve closing direction by a torsion coil spring which is not shown.

The bush 6 is formed by using stainless steel wire mesh, and configured by a cylindrical main portion 61 having a smaller diameter and a flange portion 62 having a larger diameter. The bush is assembled so that the cylindrical main portion 61 is pressingly inserted into a bush attaching portion 34 which is formed on a second shaft supporting portion 33 of the valve element 3 so as to be inwardly directed, and the flange portion 62 is interposed between the first shaft supporting portion 41 and the second shaft supporting portion 33. The bush has a structure in which, when the valve element 3 is swung, a shaft hole 63 slides over the outer peripheral face of the support shaft 5.

In the valve for a control muffler of the conventional art, however, it is highly probable that, when the support shaft 5 is welded to the first shaft supporting portion 41 in a process of assembling the valve, as shown in FIG. 7, a weld metal 8 of a welded portion reaches the bush 6 via a shaft hole 41a of the first shaft supporting portion 41 and the bush 6 is fixed to the first shaft supporting portion 41. When the valve element 3 is swung under this state, the outer peripheral face of the bush 6 and the inner peripheral face of the bush attaching portion 34 slide over each other in a pressingly contacted condition. As a result, the swinging operation of the valve element 3 is hindered so that the valve cannot be smoothly opened and closed. Furthermore, an excessive surface pressure is applied to the bush 6, so that the bush 6 largely wears and easily cracks. Consequently, there arise problems in that a valve for a control muffler in which the durability is poor and the useful life is short is produced, and that the production yield is low.

SUMMARY OF THE INVENTION

It is an object of the invention to provide a valve for a control muffler in which, when a support shaft is to be welded to a shaft supporting portion in a process of assembling the valve, fixation between the shaft supporting portion and a bearing due to a weld metal can be surely avoided and the production yield is improved.

In order to solve the problem, the valve for a control muffler according to a first aspect of the invention is a valve for a control muffler in which the valve comprises: a valve seat which is placed in an open end of an exhaust pipe in a muffler; a support shaft supported by shaft holes of a pair of first shaft supporting portions which are disposed in close proximity to the open end of the exhaust pipe; a valve element which is swingably journaled on the support shaft inside the pair of first shaft supporting portions; bearings which are respectively interposed between the support shaft and a pair of second shaft supporting portions that are disposed on the valve element to pivotally support the support shaft; and urging member for urging the valve element in a valve closing direction, and, during a low engine speed period, the valve element is caused by an urging force of the urging member to maintain an abutting state with respect to the valve seat, thereby closing the exhaust pipe, and, during a high engine speed period, the valve element is caused by an exhaust gas pressure to open the exhaust pipe, wherein a welding protrusion which protrudes in an axial direction is disposed on an outer opening edge of the shaft hole of at least one of the pair of first shaft supporting portions, and the support shaft is welded to the welding protrusion.

According to a second aspect of the invention, an engagement portion is disposed on a side of one end of the support shaft, the engagement portion abutting against the opening edge of the shaft hole of the first shaft supporting portion, to prevent the support shaft from being inward moved.

In the valve for a control muffler according to the first aspect of the invention, the support shaft is welded to the welding protrusion which protrudes in the axial direction from the outer opening edge of the shaft hole of the first shaft supporting portion. Therefore, the welding point is located in a position separated from the bearing, and hence a weld metal of a welded portion does not reach the bearing, thereby attaining an effect that welding between the first shaft supporting portion and the bearing can be surely avoided. According to the invention, consequently it is possible to obtain a valve for a control muffler which can be produced with a high yield.

In the valve for a control muffler according to the second aspect of the invention, when the support shaft is passed through the shaft holes of the first shaft supporting portions in a process of assembling the valve, the engagement portion abuts against the opening edge of the shaft hole of the first shaft supporting portion on the insertion side, thereby obtaining a state where the inward movement in the axial direction is blocked. When the support shaft is to be then welded to the first shaft supporting portion, therefore, the movement of the support shaft in the axial direction can be completely blocked by setting a state where the engagement portion is upward directed, or pressing the engagement portion toward the first shaft supporting portion with fingers. Consequently, the support shaft can be positioned easily and correctly, thereby attaining an effect that the workability of welding the support shaft is improved.

DETAILED DESCRIPTION OF THE PRESENT INVENTION

Hereinafter, embodiments of the invention will be described with reference to the drawings.
First Embodiment A valve for a control muffler of a first embodiment corresponds to the first aspect of the invention.

Figure 1:
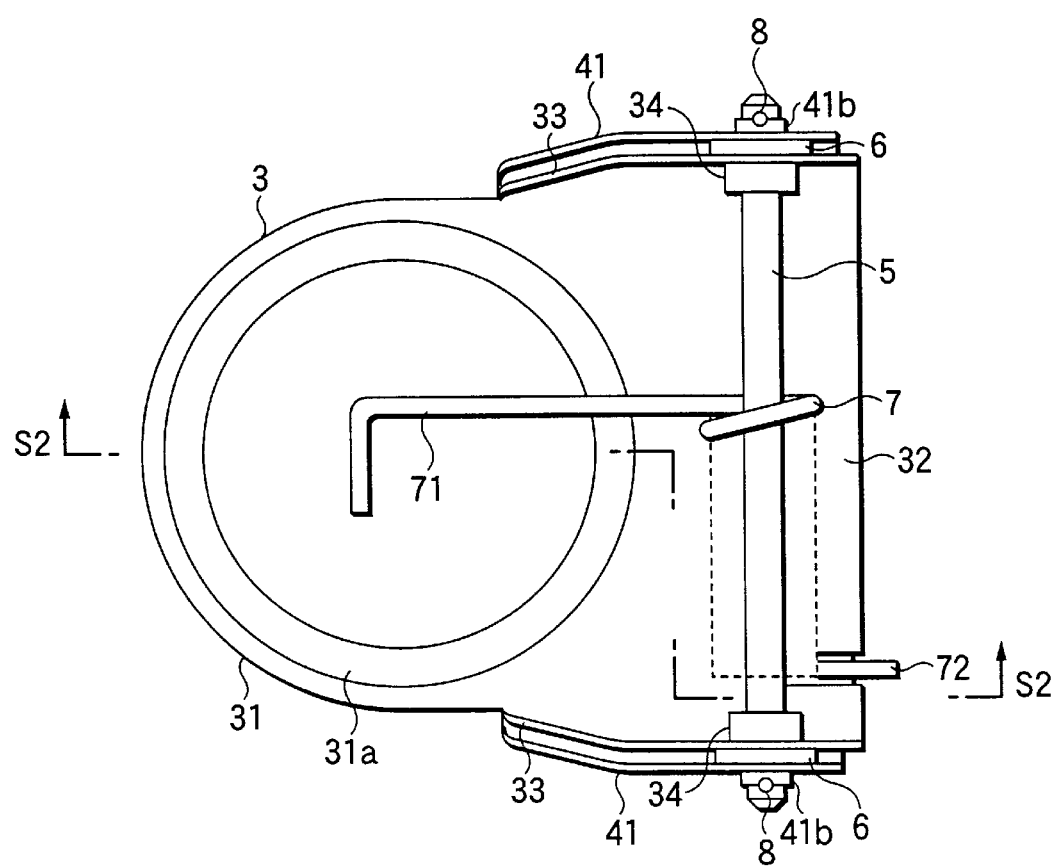
FIG. 1 is a plan view showing a valve for a control muffler of the first embodiment of the invention.
Figure 2:
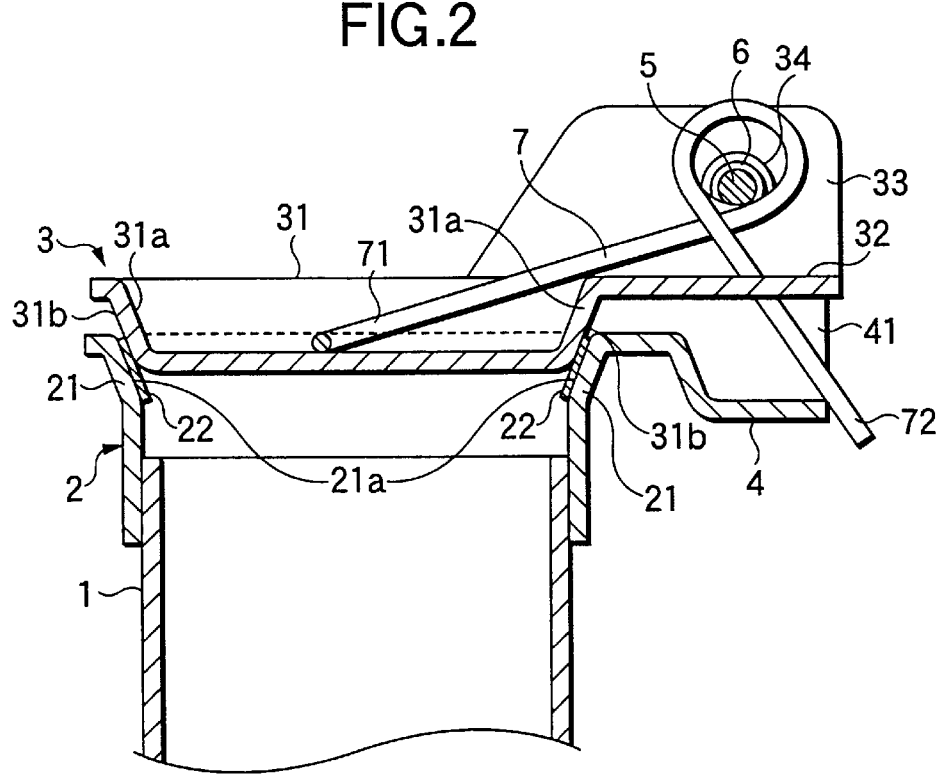
FIG. 2 is a section view taken along the line S2—S2 and showing the valve for a control muffler of the first embodiment.
Figure 3:
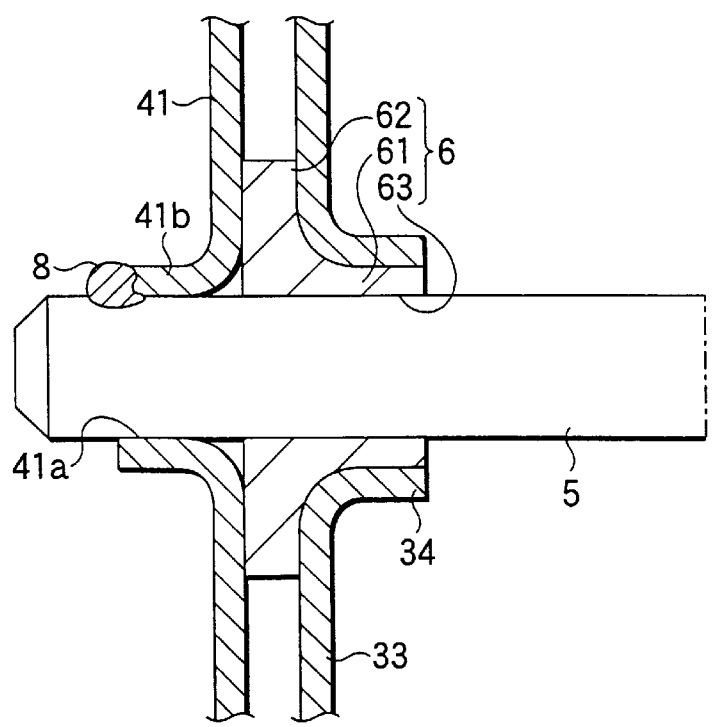
FIG. 3 is a section view showing main portions of the valve for a control muffler of the first embodiment.

FIG. 1 is a plan view showing the valve for a control muffler of the first embodiment, FIG. 2 is a section view taken along the line S2—S2 and showing the valve for a control muffler of the first embodiment, and FIG. 3 is a section view showing main portions of the valve for a control muffler of the first embodiment.

Referring to the figures, 1 denotes an inner pipe through which small chambers in a muffler are connected to each other, 2 denotes a valve seat which is disposed at the downstream end of the inner pipe 1, 3 denotes a valve element, 31 denotes a main portion which closes and opens an opening of the valve seat 2, 32 denotes a plate portion which elongates from one end of the main portion, 33 denotes second shaft supporting portions which are formed by respectively raising the ends of the plate portion 32, 4 denotes a bracket which elongates from one end of the valve seat 2, 41 denotes a pair of right and left first shaft supporting portions which are formed on the bracket 4, 5 denotes a support shaft which horizontally elongates between the first shaft supporting portions 41, 6 denotes bushes (bearings) which are respectively interposed between the second shaft supporting portions 33 and the support shaft 5, and 7 denotes a torsion coil spring (urging member).

A tapered seat portion 21 the diameter of which is gradually increased as moving toward the end is disposed in the valve seat 2. The inner face of the tapered seat portion 21 is configured as a tapered seat face 21*a*. A heat-resisting buffer seal member 22 is attached and fixed to the tapered seat face 21*a*. The heat-resisting seal member 22 is formed into an annular shape which is obtained by compressing stainless steel wire mesh into a mold, and then downward tapering the outer periphery of the compressed product.

In the main portion 31 of the valve element 3, formed is a tapered seal portion 31*a* which downward elongates in a tapered manner from the outer periphery of the main portion 31. The lower face of the tapered seal portion 31*a* is configured as a tapered seal face 31*b* which, when the valve element 3 is in the closing state, is in close contact with the heat-resisting buffer seal member 22 of the tapered seat face 21*a*, to seal the opening of the valve seat 2.

In each of the second shaft supporting portions 33 of the valve element 3, a bush attaching portion 34 is formed by inward raising the peripheral edge of an opening by a burring process. The bushes 6 are partly attached to the bush attaching portions 34 in a press-fitted state, respectively.

A shaft hole 41*a* through which the support shaft 5 can be passed through is opened in each of the shaft supporting portions 41. A welding rising portion (welding protrusion) 41*b* which is outward raised by a burring process is disposed in the peripheral edge of each of the shaft holes 41*a*.

The ends of the support shaft 5 are passed through the shaft holes 41*a* of the shaft supporting portions 41, and welded and fixed to tip ends of the welding rising portions 41*b*, respectively. The reference numeral 8 denotes a weld metal.

Each of the bushes 6 is formed by compressing stainless steel wire mesh into a mold, and configured by a cylindrical main portion 61 having a smaller diameter and a flange portion 62 having a larger diameter. A shaft hole 63 through which the support shaft 5 can be passed through is opened in the axial center of each bush. Each of the bushes is attached in a state where the cylindrical main portion 61 is pressingly inserted into the corresponding bush attaching portion 34 from the outside, and the flange portion 62 is interposed between the second shaft supporting portion 33 and the first shaft supporting portion 41.

The torsion coil spring 7 is inserted onto the support shaft 5 to be supported thereby. In a state where one end portion 71 of the spring abuts against the upper face of the main portion 31 of the valve element 3 so that an urging force is accumulated, the other end portion 72 abuts against the bracket 4 to urge the valve element 3 in the valve closing direction.

When the valve for a control muffler is to be assembled, the cylindrical main portions 61 of the bushes 6 are first pressingly inserted into the bush attaching portions 34 of the valve element 3 from the outside, respectively.

Next, the second shaft supporting portions 33 of the valve element 3 are placed inside the first shaft supporting portions 41 of the bracket 4, the torsion coil spring 7 is placed between the second shaft supporting portions 33, and the shaft holes 41*a* of the first shaft supporting portions 41 and the shaft holes 63 of the bushes 6 are aligned on a straight line. Under this state, the support shaft 5 is passed through the shaft holes from the outside of one of the first shaft supporting portions 41, in the sequence of the shaft holes 41*a*, 63, 63, and 41*a*.

Then, the support shaft 5 is welded to the tip ends of the welding rising portions 41*b* to be fixed to the first shaft supporting portions 41.

As described above, in the valve for a control muffler of the embodiment, the first shaft supporting portions 41 to which the support shaft 5 is to be fixed are configured so that the welding rising portions 41*b* that are outward raised by a burring process are disposed in the shaft holes 41*a* through which the support shaft 5 is to be passed through, and the tip ends of the welding rising portions 41*b* are weldedly attached to the support shaft 5. Therefore, the welding points are located in positions separated from the bushes 6, so that, even when the weld metal 8 is moved via the shaft holes 41a by a certain distance toward the inner side of the valve element 3, the weld metal does not reach the flange portions 62 of the bushes 6, thereby attaining an effect that welding between the first shaft supporting portions 41 and the bushes 6 can be surely avoided.

Second Embodiment

A valve for a control muffler of the embodiment corresponds to the second aspect of the invention. The components of the embodiment which are identical with those of the first embodiment are denoted by the same reference numerals as those used in the first embodiment, and their description is omitted.

Figure 4:
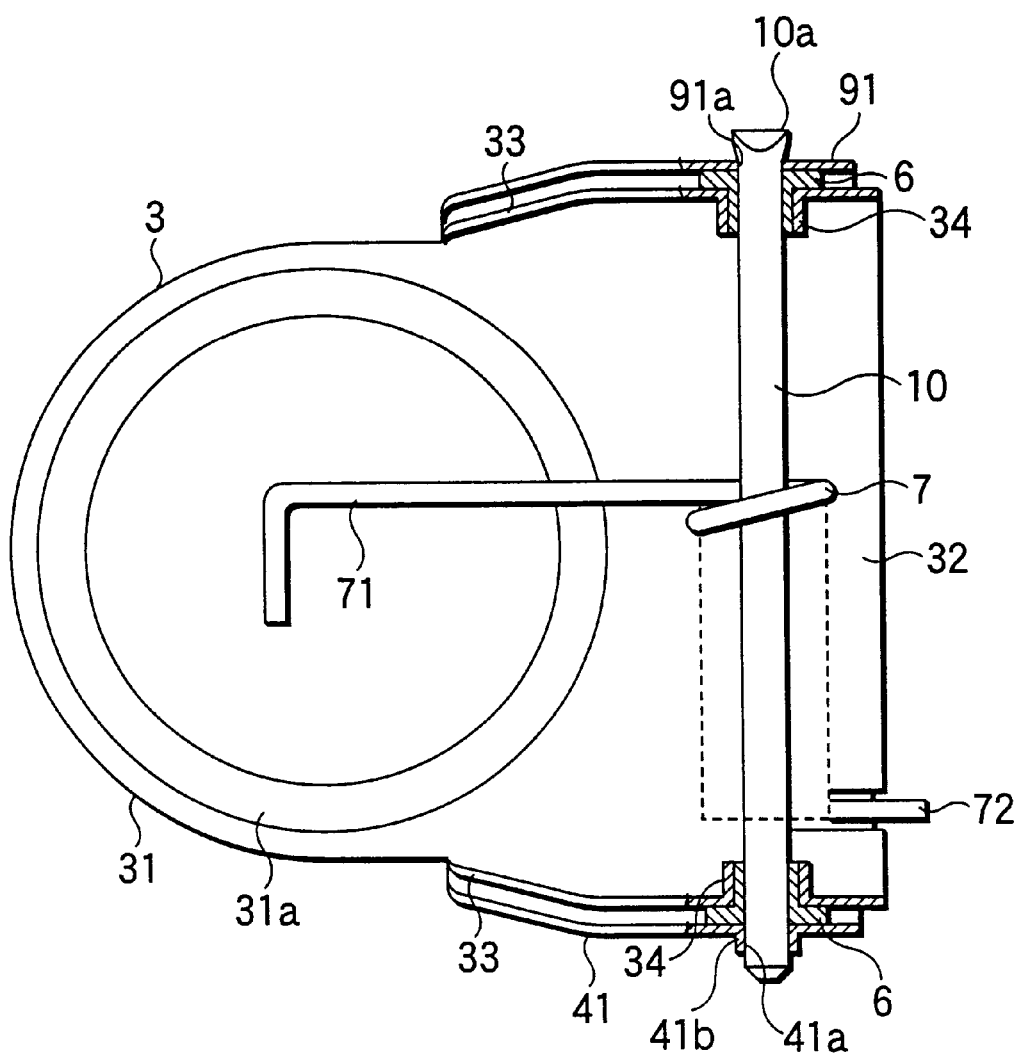
FIG. 4 is a partially sectional plan view showing a valve for a control muffler of a second embodiment.
Figure 5:
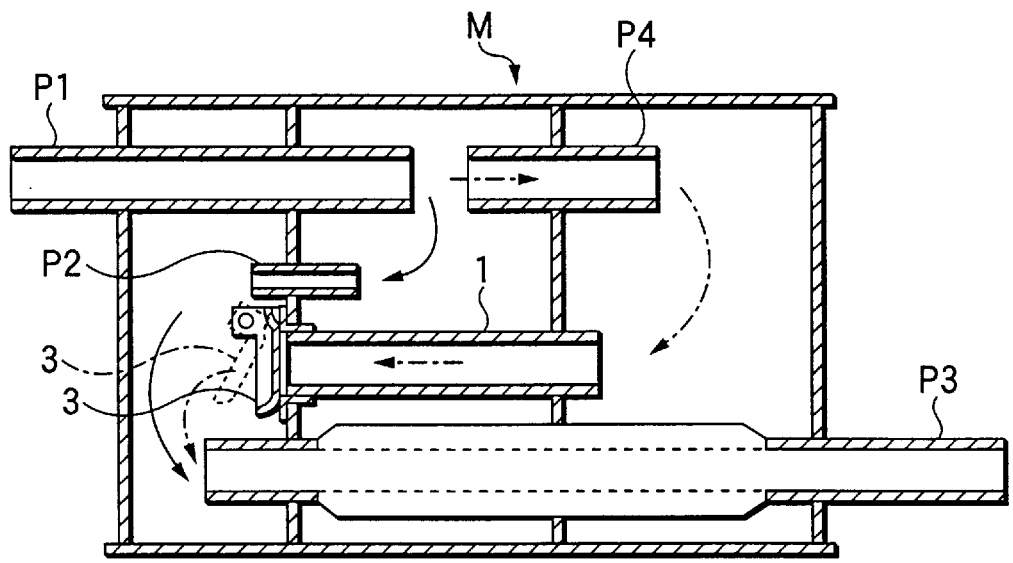
FIG. 5 is a section view showing an example of a muffler to which a valve for a control muffler of the conventional art is applied.
Figure 6:
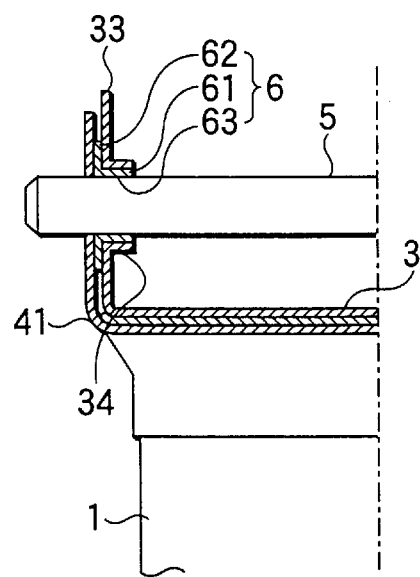
FIG. 6 is a partially sectional rear view showing the valve for a control muffler of the conventional art.
Figure 7:
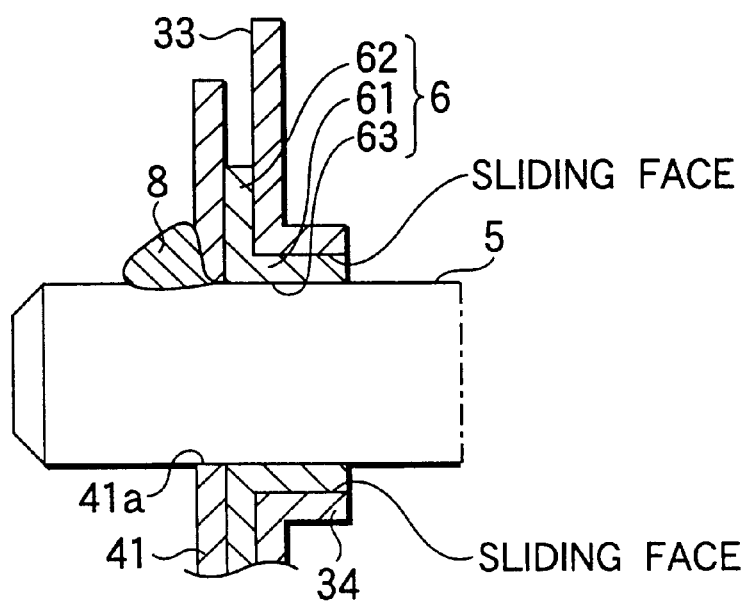
FIG. 7 is a section view showing main portions of the valve for a control muffler of the conventional art.

In the valve for a control muffler of the first embodiment, a burring process is applied to the shaft holes 41a of the first shaft supporting portions 41 to dispose the welding rising portions 41b which outward protrude, in the peripheral edges of the openings, and the ends of the support shaft 5 are welded to the first shaft supporting portions 41, respectively. By contrast, the valve for a control muffler of the present embodiment is different from the first embodiment in that, as shown in FIG. 4, a burring process is applied only to the shaft hole 41a of the one first shaft supporting portion 41 to dispose the welding rising portion 41b, and only a shaft hole 91a is opened in the other first shaft supporting portion 91. The valve is different from the first embodiment also in that a squeezing process is applied to one end of a support shaft 10 to form an engagement portion 10a.

In the valve for a control muffler of the embodiment, when the support shaft 10 is passed through the shaft holes 91a and 41a of the first shaft supporting portions 91 and 41 in a process of assembling the valve, the engagement portion 10a of the support shaft 10 abuts against the opening edge of the shaft hole 91a of the shaft supporting portion 91 on the insertion side, thereby attaining a state where the inward axial movement of the support shaft is blocked. In the case where the support shaft 10 is to be then welded and fixed to the first shaft supporting portion 41, therefore, the movement of the support shaft 10 in the axial direction is completely blocked by setting a state where the engagement portion 10a is upward directed, or pressing the engagement portion 10a toward the first shaft supporting portion 41 with fingers. Consequently, the support shaft 10 can be positioned easily and correctly, thereby attaining an effect that the workability of welding the support shaft 10 is improved.

In the above, the embodiments of the invention have been described. The specific configuration of the invention is not restricted to the embodiments, and even a design change or the like which does not depart from the spirit of the invention falls within the scope of the invention.

In the embodiments, the configuration in which a burring process is applied to the first shaft supporting portion to dispose the welding rising portion over the whole periphery of the shaft hole has been described as an example. The welding protrusion may have any shape, and may be configured by disposing a protruding piece or the like on the opening edge of the shaft hole. Namely, it is requested only that the tip end which will be used as the welding position with respect to the support shaft is in the position separated from the shaft hole.

In the first embodiment, both the ends of the support shaft are welded and fixed. Alternatively, only one end may be welded, and the other end may be subjected only to supporting.

In the second embodiment, the support shaft on which a squeezing process is previously applied to form the engagement portion is used. Alternatively, a squeezing process may be applied to one end or both ends of the support shaft during an assembling process.

What is claimed is:

1. A valve for a control muffler the valve comprising:
    a valve seat placed in an open end of an exhaust pipe in the control muffler;
    a support shaft supported by shaft holes of a pair of first shaft supporting portions which are disposed in close proximity to the open end of the exhaust pipe;
    a valve element swingably journaled on the support shaft inside the pair of first shaft supporting portions;
    a pair of bearings respectively interposed between the support shaft and a pair of second shaft supporting portions that are disposed on the valve element to pivotally support the support shaft;
    an urging member for urging the valve element in a valve closing direction;
    a welding protrusion protruding in an axial direction, the welding protrusion disposed on an outer opening edge of the shaft hole of at least one of the pair of first shaft supporting portions,
    wherein the support shaft is welded to the welding protrusion;
    the urging member causes the valve element to maintain an abutting state with respect to the valve seat to close the exhaust pipe during a low engine speed period; and
    an exhaust gas pressure from the exhaust pipe causes the valve element to open the exhaust pipe during a high engine speed.

2. The valve according to claim 1, wherein an engagement portion is disposed on a side of one end of the support shaft, the engagement portion abutting against the opening edge of the shaft hole of the first shaft supporting portion, to prevent the support shaft from being inward moved.

3. A control muffler comprising:
    an exhaust pipe having an open end, the exhaust pipe having a valve seat placed in the open end of the exhaust pipe;
    a first shaft supporting portion disposed in close proximity to the open end of the exhaust pipe, the first shaft supporting portion defining a shaft hole;
    a support shaft supported by the shaft hole of the first shaft supporting portion; and
    a valve element swingably journaled on the support shaft inside the first shaft supporting portion;
    wherein the first shaft supporting portion has a welding protrusion protruding in an axial direction of the support shaft, the welding protrusion disposed on an outer opening edge of the shaft hole of the first shaft supporting portion.

4. The control muffler as claimed in claim 3, further comprising:
    a second shaft supporting portion disposed on the valve element to pivotally support the support shaft;
    a bearing interposed between the support shaft and the second shaft supporting portion; and
    an urging member for urging the valve element to close the open end of the exhaust pipe.

5. The control muffler as claimed in claim 4, wherein the support shaft is welded to the welding protrusion.

6. The control muffler as claimed in claim 5, wherein the urging member causes the valve element to maintain an abutting state with respect to the valve seat to close the exhaust pipe during a low engine speed period; and an exhaust gas pressure from the exhaust pipe causes the valve element to open the exhaust pipe during a high engine speed.

7. The valve according to claim 6, wherein an engagement portion is disposed on a side of one end of the support shaft, the engagement portion abutting against the opening edge of the shaft hole of the first shaft supporting portion, to prevent the support shaft from being inward moved.

* * * * *